May 7, 1957  S. B. WICZER  2,791,132
DIFFERENTIAL
Filed Aug. 26, 1952  2 Sheets-Sheet 1
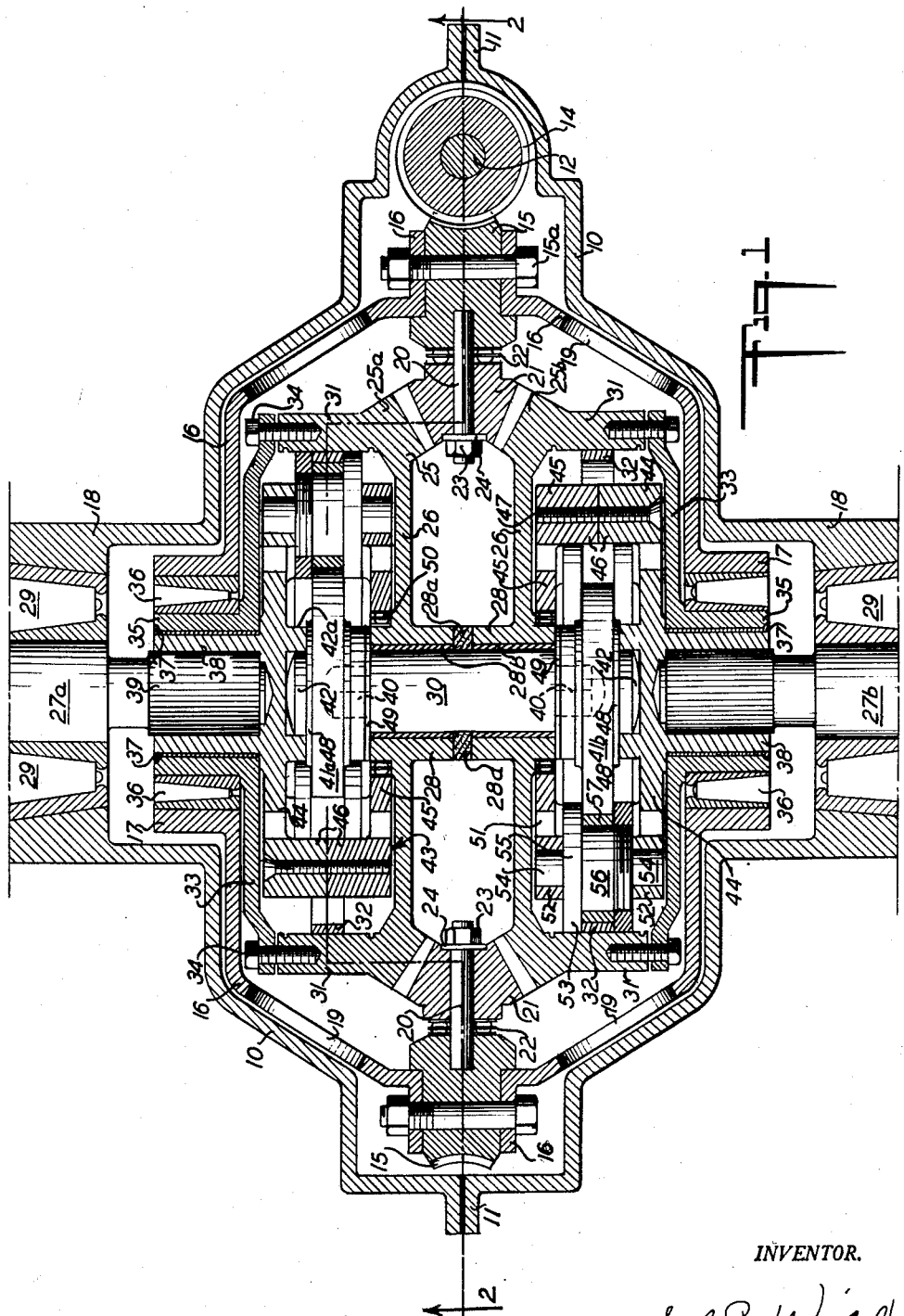
INVENTOR.
Sol B Wiczer

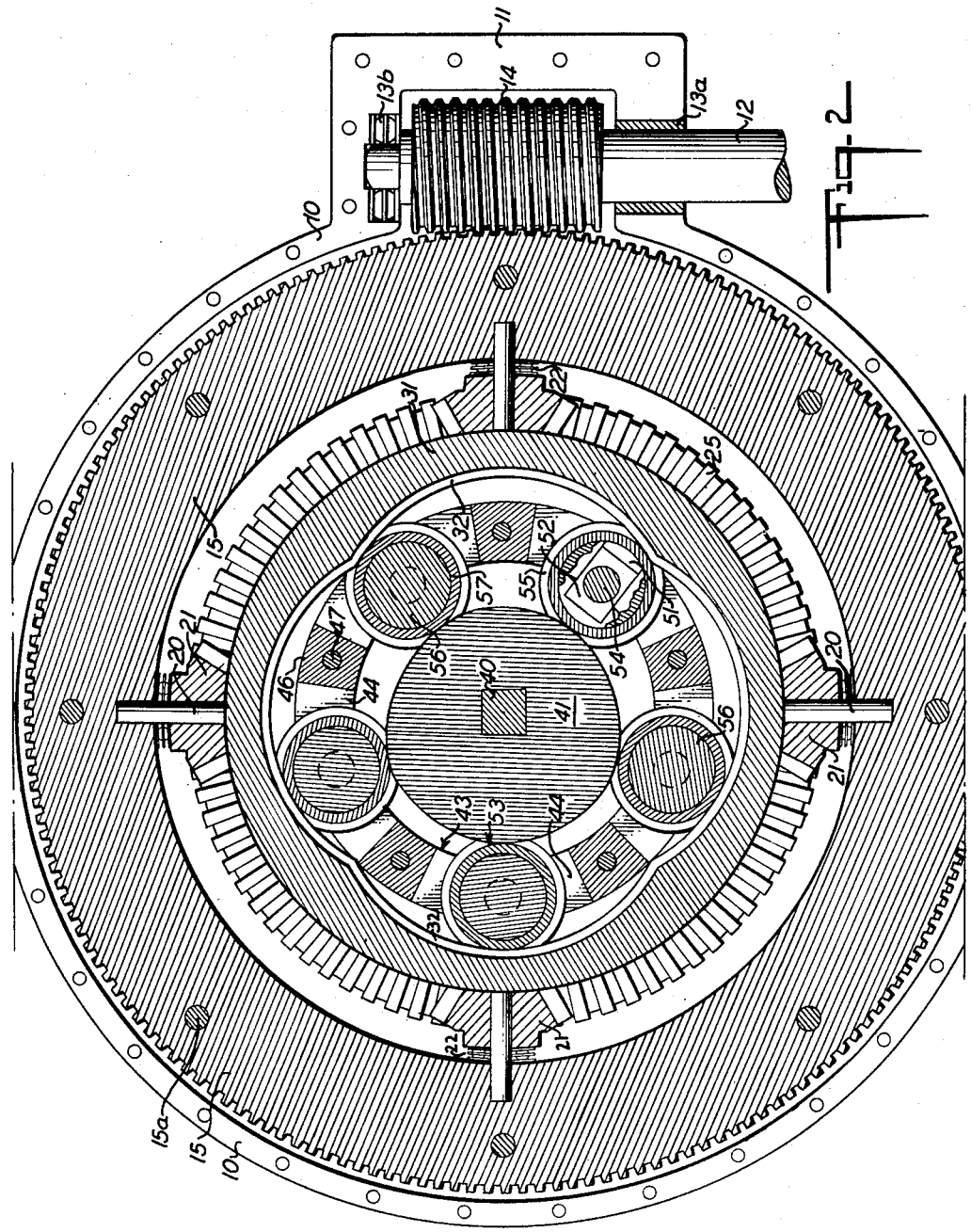

United States Patent Office 2,791,132
Patented May 7, 1957

2,791,132

DIFFERENTIAL

Sol B. Wiczer, Washington, D. C.

Application August 26, 1952, Serial No. 306,333

10 Claims. (Cl. 74—711)

The present invention relates to differential gearing, and in particular to differential gearing modified to allow a continuous positive drive through both driven elements of the differential, but differentially variable from equal speeds of driven elements to any selected limiting speed ratio.

Thus the present invention contemplates selection of an ultimate ratio as a limit below which either of the driven elements may not be slowed with respect to the driving element. Hence, while in normal driving for equal resistance on the driven elements their relative speeds would be equal, i. e. a ratio of 1 to 1, a greater resistance applied to one of the driven elements would allow it to slow to the maximum pre-selected gear ratio of one driven elements with respect to the other of for example from 1 to 4 or to 4 to 1, including any intermediate ratio, depending upon the stress or relative resistance of either one of the driven elements.

The differential gearing of the present invention if used as an ordinary vehicle differential, the driven elements being the axles of an automobile or truck for example, would allow positive drive at all times to both axles but allow either of the driven axles, through the differential gearing of this invention, to slow to the pre-selected maximum gear ratio. This would overcome common spinning of one axle on ice or skidding on hills since there would always be some positive drive in both axles, but unequal strains on the axles would still allow adequate differential speeds within the pre-selected ratio.

The invention is illustrated by reference to the drawings herein showing by way of illustration the improved gearing hereof mounted as an automotive differential gearing constructed to operate by slowing either of the driven elements to ¼ of the driving speed, but it will be understood that constructions with higher or lower ratios may be selected as desired using analogous construction.

Fig. 1 is a sectional elevation taken coaxial through the driven elements and through the center line of a differential useful as an automobile differential; and Fig. 2 is a transverse elevation or side view in section taken on the line 2—2 of Fig. 1.

As illustrated, the structure includes a housing 10 for the differential gearing comprising two symmetrical halves bolted together through complementary flanges 11, in the upper portion of which is journaled the drive shaft 12 through supporting bearings 13a and 13b for rotation of a worm gear 14 which meshes with a conventional ring gear 15.

The ring gear 15 as shown herein is mounted by bolting, by bolts 15a, symmetrically between halves of a spider and axle gear case 16, each of which terminates at their sides in a cylindrical bearing supporting flange 17 concentric with an axle housing 18 integral with the differential housing 10. The gear case 16 may have several openings 19 to allow free flow of lubricant to the gears and bearings.

Supported from the inner side of ring gear 15 through pins or studs 20 are several spider gears 21, which are supported thereby and are freely rotatable about the fixed studs 20 and against an intermediate thrust bearing 22, the studs 20 having a gear retaining nut 23 and a washer 24. According to the construction illustrated, four spider gears 21 would be symmetrically disposed around the inner side of ring gear 15, but any number, similarly symmetrically disposed and supported in equivalent rotatable construction as known in the differential art, could be used.

The spider gears 21 have mounted in meshed relationship thereto a pair of axle gears 25 which in the present invention are modified to be carried as part of, or integral with, housings 26 comprising direct coaxial speed reducing drives, as hereinafter described in detail.

In usual operation with equal resistance in both axles the subassembly within housing 26 directly couples the rotary motion of ring gear 15 through spider gear 21 and axle gears 25 to co-axially supported axles, a left axle 27a and a right axle 27b, the entire gear system and axles being supported by bearings 29 for substantially frictionless rotation.

The coaxial speed reducing elements hereof mounted within axle gear housings and directly coupled to give modified differential action according to the present invention, are themselves of known principle of which several types are available in the art (U. S. Patents 1,449,352; 1,870,875; and 1,738,662). These prior constructions generally comprise a driving shaft carrying a cam operative to radially displace balls, rollers, or pins by cam action, which elements cooperate with radially disposed curved depressions or teeth in an outer face comprising a reactor against which radially cam-displaced elements, acting through a driven shaft coupled to said elements, are forced to rotate in the same direction as the driving element, but at a speed reduced in direct proportion with the number of radially displaceable elements and reactor teeth or convolutions. Such prior construction, of course, has the obvious advantage of a speed reducing drive with both input power drive shaft and output driven shaft in direct coaxial alignment, and by the term herein used, as "direct coaxial speed reducing drive," such system will be generically understood. However, in the construction shown in this invention, further advantage is taken of such system in the fact that such coaxial speed reducing drive is either not reversible, or is reversible only under remote conditions because such a system, under reverse power, will normally bind through the cam and roller elements, whereby the whole system will rotate as a unit when rotary motion is applied to drive what is normally the driven element. Thus application of power in reverse will give rotation thereby, but not speed reduction. It is with two such speed reducing systems directly coupled together that the desirable differential action hereof with positive but variable speed reduced drive is made available in both axle shafts according to the present invention.

To this end, the construction illustrated herein has each axle gear 25 mounted on a housing 26 which terminates on the inner side in a cylindrical sleeve support member 28 allowing each housing 26 to extend toward the other and separated by a separator disc washer 28a of which each support 28 may internally carry a sleeve bearing 28b to be freely rotatable with respect to a centrally mounted stub shaft 30 which positively and directly interconnects both speed reducing drives by squared ends 40.

The cylindrical end walls 31 of each housing 26 carry integrally therewith on the inner cylindrical wall thereof at 32 a reactor wall having four convolutions. (Fig. 2) comprising an annular series of arcuate surfaces, each arc being of substantially lesser diameter than the cylindrical housing wall 31, each convolution comprising an arc extending by its lesser diameter radially inward of said housing wall 31. The opposite axial side of each cylindrical housing 26 is closed by a plate 33 fastened to the axial end of cylindrical wall 31 by studs 34 and terminating centrally in a cylindrical flange 35 which is concentrically parallel to flange 17 and separated for independent rotary support therefrom by an antifriction bearing 36. The inner annular wall of each flange 35 may carry a sleeve bearing 37 to reduce the friction of an inner rotating driven hub member 38 joined by splines distributed radially about its inner cylindrical surface to the inner splined end 39 of each axle 27a and 27b to complete the drive therewith.

As thus far described the two axle gear assemblies in each housing 26 are independently mounted to approach each other only at hubs 28 separated for independent rotation by spacer ring 28a except for the meshing of axle gear 25 with pinion gears 21, and as being interconnected by a stub shaft 30 which has square (or splined) ends 40 through which cams 41 are drivingly connected to each other at each end of the stub shaft 30.

The center of each cam 41 has a hub member 42, opposite to squared or splined ends 40 of the stub shaft 30, for rotary support of the opposite side of the cam through a hollowed central hub portion 42a of a driven cage member 43. Each cage member 43 comprises a driven element, either directly by a splined axle end 39 meshing with hub member 38 on one side of said cage member 43, or indirectly in reactive speed reduction by squared stub shaft ends 40 on the other side thereof acting upon a cam 41, and is adapted to house and partially support in the center thereof the driving cam 41 and several cooperating radial thrust rollers symmetrically disposed about the outer cam surface.

The cage member 43 is an assembly of two disc-like face plates, an outer face plate 44 and an inner face plate 45, both face plates being interconnected into a cage by bridging elements 46 (Fig. 2), symmetrical portions being carried by each face plate and extending inwardly toward each other and fastened together to form the cage 43 by threaded studs 47. Extending concentrically from each outer face plate 44 are cylindrical hub members 38, internally splined to connect drivingly with each splined end of an axle shaft 39, and on the inner opposite side of the outer face plate 44, extending toward each cam member 41, is a cylindrical hub 42a adapted to receive and rotatively support each cam hub 42, and which may further bear against the outer face of cam 41 through a thrust washer or bearing 48. The opposite inner face of each cam 41 bears against the cylindrical support member 28 of the housing 26 through an intermediate friction reducing thrust washer or bearing 49. The inner face plates 45 are supported from the outer cylindrical walls of support members 28 through anti-friction bearings 50. Both cage assemblies 43, thus supported, are rotatable as actuated indirectly in speed reduction by stub shaft 30 through cam actuation, as hereinafter described, and reaction of displaceable elements upon housing wall convolutions 32 with a minimum of friction.

Each cage 43 and radially displaceable rollers, as hereinafter described, are somewhat similar to that shown in U. S. Patent No. 1,449,352, but modified by the type of cam shown in U. S. Patent No. 1,870,875, and further reference may be made to these patents for minor details of construction. Thus, the inner and outer plate members 44 and 45 assembled to cage 43 each have five complementary grooves or slots 51 extending radially inward toward the center from the peripheral edge of each annular plate in which are fitted for radial sliding movement cooperating cross heads 52, each pair of which, sliding radially in opposite cooperating grooves 51, carry rotary mounted rollers 53 through short spindle shafts 54, through which they are journaled in the cross heads 52 for radial sliding movement, allowing the rollers 53 to rotate in said cross heads while sliding radially inward and outward from the center of cage 43. The rollers are constructed to have outer flanges 55 separated by a web portion 56 of lesser diameter. The web portion 56 may comprise merely a stub having threaded ends to which the flanges 55 are removably attached so that a hard wearing sleeve portion 57 may be mounted thereabout and retained between flanges 55. Thus the web portion 57 of each roller assembly cooperates and rides both upon the cam surface 41, and upon arcuate track 32. This construction allows replacement of sleeves 57 after wear. In alternate construction the rollers 53 may be solidly integral so that the complete roller element may be replaced after wear.

To explain the overall principle of operation, the manner of operation of each speed reducing sub-assembly, as shown in U. S. Patents 1,449,352 and 1,870,875, is first explained and these are considered independently of the overall system, that is, as if stub shaft 30 were freely rotated as the power input shaft independently of the other speed reducing system to which it is normally interconnected. Rotation of stub shaft 30 drivingly rotates cam 41a. The five rollers 53 spaced about the surface of cam 41a are thereby radially displaced in sequence, each sliding radially within a pair of grooves 51 in the supporting cage member 43 and rolling upon the surface of the cam as it rotates. The thrust of the cam also forces each roller to press radially against its contact position on convoluted track 32, which is fixed to housing 26, the latter also carrying gear 25a. The convoluted track 32, arcuately shaped, comprises an inclined plane with respect to the radial thrust of a roller thereagainst, and that radial thrust of each roller against the track 32 tends to force the attached housing 26 and axle gear 25 to rotate in a reverse direction to that of the cam. Simultaneously, or alternatively, the cam may force the rollers and the cage assembly 43 therewith to rotate together with an axle shaft 27a splined thereto in the same direction as the cam is being rotated, but with a reduced speed depending upon the number of convolutions. As shown in the specific construction herein, the speed reduction is four to one. That is, as sub-shaft 30 and cam 41[a] rotate completely four times, the cage assembly 43 and axle 27a splined thereto will rotate once and in the same direction. That is, to repeat in other words, when cam 41a makes a complete revolution, a single roller will move from a position of minimum to maximum displacement within a convolution. But each of rollers 53, at any particular position of the cam, is at a different position of the convoluted surface so that the reactive thrust is continuous and even against the track 32 either to move the track and axle gear 25a attached thereto in reverse, or if, as shown in each of the patents, the gear is stationary, then the cage element will move in the same direction as the cam 41a at reduced speed, because a complete revolution of the cam will displace a roller a reactive peripheral distance of a single convolution. Thus when a cam is the driving element, the rotation thereof and speed reduction effected is smooth and without any tendency of the rollers to bind and whose radial thrust is substantially even in all radial directions upon all rollers simultaneously notwithstanding each are in a different radially displaced position. Thus it will be understood that when a single cam 41a is being rotated by the stub shaft 30, the result would be speed reduction and forward drive of the axle 27a through its cage 43.

Considering the housing 26 carrying gear 25a meshed through spider gears 21 to the driving ring gear 15 as the driving element, they could drive the cam 41a therein in two ways, wherein all of the rollers serve as connecting elements from the track 32 carried by the housing to the surface of the cam, to transfer the rotative force thereto: first, by reversal of the process of speed reduction described above, whereby each rollers reciprocates radially and rolls through each convolution and ultimately steps up the speed of the cam to turn it four times as rapidly as the rotating axle gear and in a direction reversed thereto: or secondly, the whole sub assembly would bind against the face of the cam into a direct drive and in the same rotary direction as the axle gear. This second effect is the only one that results because the cam cannot readily be driven by forces applied by rollers to its surface, where there is both a tendency to bind and where it would require more force to make the cam rotate at a greater speed as would be necessary for the speed stepup and the conditions are such where the cam can bind with less expenditure of force. Hence, it will be clear that where the axle gear 25 is the driving element, the rollers 53 will bind on the cam to cause the subassembly to bind and drive directly in 1 to 1 ratio on the cam and subshaft 30 attached thereto as well as the cage 43 therein and axle 27a.

The same tendency to bind through the rollers will take place when the axle 27a is a driving element through the cage 43, and cam 41a will also rotate therewith in 1 to 1 ratio when the axle 27a is driving.

However, according to the total assembled construction of this invention both cams 41a and 41b are fixed for positive drive to each end of stub shaft 30. Thus where either an axle 27a through its cage 43 or gear 25a is the driving element upon the surface of cam 41a there is binding of the rollers in the left hand subassembly and sub shaft 30 becomes driven at speed of axle 27a or gear 25a, which is driving in 1 to 1 ratio and in the same direction. But the opposite cam element 41b upon the stub shaft 30 and drive therewith becomes at the same time a driving element with respect to its subassembly and effects speed reduction thereon so that axle shaft 27b is driven in the same direction as stub shaft 30 at reduced speed by the effect on its rollers of cam 41b because there is no binding when the cam 41b is the driving element with respect to its subassembly.

Theoretically, if one of the axle shafts 27a was the driving element through a cage assembly 43, and thence, by reaction through the rollers 53, drive cam 41a, it might be possible as shown in Pat. No. 1,449,352 using a double lobed cam for the cam to rotate four times as fast as the now driving element, axle shaft 27a. However, since the ends 40 of the subshaft 30 are drivingly connected to both cams the opposite axle gear assembly when driven by shaft 30 will step the speed down four times with respect to the driving axle shaft 27a. Hence the drive of the first axle shaft 27a may be anywhere from four to one to one to one since the speed may be stepped up four times by drive upon its cam 41a, and then stepped down four times by communication through to the opposite cam whereby the resulting speed of both axles is the same. However, there is always a tendency for the cage assembly to bind where the track 32 rotates drivingly upon the rollers to drive the cam, since a cam surface does not make a good reversible drive. Hence, where one axle shaft tends to be the driving element in differential action as hereinafter described, the reduction on the opposite axle shaft is generally somewhere between four to one and one to one because there is always good step down of speed where one cam element is the driving force through displacement of rollers upon an axle shaft, but there is not good step up of speed where an axle shaft is the driving element through rollers upon a cam. It is for this reason that a multi-lobed cam as shown in U. S. Patent 1,449,352 will also be operative herein.

The actual speed reduction of the device herein shown is dependent upon the number of rollers, and the number of convolutions in the outer race 32. Hence it is a matter of choice and design. Where, for example, the cam has merely a single lobe as shown, four rotations of such cam will give only one rotation of the driven cage member 43, or a step down of four to one. The single lobed cam used herein and as shown in U. S. Patent 1,870,875 or 1,738,662 referred to above, allows no possibility, due to the single eccentric displacement per rotation of the driving cam, of obtaining reversibility of action, inasmuch as the axial displaceable elements, rollers, balls or pins, as known in the art, would not give reversible drive speed up, but the whole system would bind into unit when the driven element tends to drive even as the presently shown system tends to bind, the ratio in veverse thereby being 1 to 1.

In overall operation of the differential herein for ordinary differential action, the drive of worm gear 14 against ring gear 15 carrying pinions 21 therewith and meshing with both axle gears 25 causes the total assembly to rotate through the binding action of convolutions and track 32 within each axle gear carried through to axle shaft 27a and 27b, with equal positive forward rotation of both axle shafts in accordance with the usual reduced speed of the driving input at the worm gear 14. Considering the present differential as if it were a normal differential and considering the action that would result from normal differential action, if unbalanced resistance (i. e. if the opposite axle is free to spin such as an axle having a vehicle wheel resting on ice, a wheel without substantial traction) were encountered in the forward drive of the left-hand axle shaft 27a (Fig. 1), that axle would normally tend to slow down in its forward movement thereby slowing its axle gear 25a through the binding action of rollers 53 on track 32; spider gears 21 would then rotate, allowing axle gear 25b attached to the opposite right-hand axle shaft 27b to spin rapidly forward in accordance with the input drive of the ring gear 15. According to the present system, with a similar resistance placed upon the left-hand axle shaft 27a, the axle gear 25a, binding through its assembly attached thereto, would normally tend to slow down, thereby allowing pinions 21 to rotate on pins 20 and the right-hand axle gear 25b and shaft 27b to move rapidly forward in accordance with the input rotation of ring gear 15. The relatively rapid rotating axle shaft 27b or the relatively rapid rotating axle gear through reaction of a track 32 would tend to drive the cage assembly 43, rollers and cam attached thereto at the same forward rapid rate. This is a direct binding 1 to 1 drive on the cam 41b within the gear 25b housing. This speed is communicated to stub shaft 30, which is directly connected to drive the opposite cam 41a at the same speed attached to the relatively slow moving or stationary left-hand axle shaft 27a. Thus by rotation of cam 41a with consequent speed reduction by displacement of rollers against its track 32, cage 43 housing the same and axle 27a are forced to rotate in a forward direction at a speed not less than the maximum speed reduction of four to one. To take a situation where the axle shaft 27a, by its resistance to rotation relative to 27b, would normally be stopped from rotating in the average differential, and the right-hand axle shaft 27b would be rotating at 100 R. P. M., then by normal rapid spinning differential drive through the cage 43b carrying by roller binding effect cam 41b therewith which drives stub shaft 30 as well as the opposite cam 41a, the cage 43a would be forced to rotate forward but at a reduced speed of at least 25 R. P. M.

Thus, according to the system herein shown, it is possible for either axle shaft 27a or 27b to slow with respect to the opposite axle, but by the construction hereof, it is never possible for either axle shaft to slow beyond the maximum speed reduction ratio for which the unit is designed.

I claim:

1. Differential gearing comprising a housing, means for rotatively driving the housing, a pair of side gears in said housing meshing with and separated by several spider gears, each of said side gears reactively housing a co-axial non-reversible speed reducing means, each including a speed reduced driven element, the speed reduced driven element being drivingly associated with an axle, and a single driving element comprising an input drive for each speed reducing means drivingly interconnecting the two speed reducing means.

2. In differential gearing, a pair of drivingly interconnected co-axial nonreversible speed reducing means, each having a speed reduced output drive connected to an axle for speed reduced drive thereof, a pair of side gears each mounted about one of the speed reducing means as a torque reactor for speed reducing elements therein, both side gears being intermeshed with several spider gears, a housing encasing both said side gear and speed reducing means and planetarily supporitng said spider gears while allowing free rotation therein of said side gears and speed reducing means, said housing having a ring gear surrounding the same for rotatory drive thereof.

3. In differential gearing, a housing surrounded by a ring gear for rotary drive thereof, a pair of side gears mounted in said housing intermeshing with several spider gears planetarily supported by said housing, a pair of co-axial speed reducing means each mounted within a side gear as a subhousing therefor, both coaxial speed reducing means being coaxially interconnected by an input driving element, each co-axial speed reducing means comprising a cam having planetarily mounted thereabout several elements radially displaceable by eccentric movement of said cam, a convoluted reactor mounted within the inner surface of a side gear comprising said subhousing cooperating with said radially displaceable elements for reactive thrust thereagainst, said radially displaceable elements being mounted within a rotatable cage member in said side gear, said cage member being drivingly connected to an axle as an output drive of said speed reducing means whereby rotation of said cam to radially displace said elements in sequence reacting against said convoluted surface alternatively reactively drives the side gear in a reverse direction to the input driving element, or drives the cage element and axle shaft drivingly connected thereto in the same direction as the driving input upon said cam but at a speed reduced in proportion to the number of convolutions, whichever movement requires less power responsive to the differential condition.

4. In differential gearing, two co-axial speed reducing means, each speed reducing means comprising a cam mounted within a reactor having a plurality of convoluted reactor surfaces radially surrounding the eccentric surface of said cam, several radially displaceable elements mounted between said eccentric cam surface and said convoluted surfaces, there being one more radially displaceable element than convolutions in said reactor, a rotary mounted cage member in said reactor surrounding said radially displaceable elements and supporting the same for radial movement as well as rotation as a unit about the driving axis of said cam while circumferentially spacing said displaceable elements about said cam, each of the cams of the co-axial speed reducing means being drivingly interconnected, a side gear co-axially mounted about each reactor of a co-axial speed reducing means and drivingly fastened to rotate with the surface convoluted to form the reactor element of a co-axial speed reducing means, both of said side gears intermeshing with several spider gears, a housing planetarily supporting said spider gears for planetary rotation thereof, said housing supporting said side gears for free rotation thereof in said meshed relationship as a differential, two axle shafts drivingly connected each to a cage member of a co-axial speed reducing means in said housing and a ring gear surrounding said housing for differential drive thereof.

5. In a differential drive having side gears intermeshed with spider gears differentially supported within a housing and outer gears for drive of the housing, the combination with said side gears of a pair of drivingly interconnected co-axial non-reversible speed reducing means, each reactively mounted within one of said side gears with each of said co-axial speed reducing means having its speed reduced output drive drivingly connected to an axle shaft.

6. A speed reducing mechanism comprising a rotary input drive shaft having a pair of cams mounted on opposite axial ends thereof, a rotary mounted reactor housing about each cam, each reactor housing having a series of radial convolutions about the inner radial surface thereof, a series of radially displaceable elements mounted between a cam surface and the surrounding convoluted reactor surface, there being at least one displaceable element for each convolution, said displaceable elements being mounted in radially disposed position about a cam surface within a rotary mounted cage element concentric with said shaft, each cage element supporting said displacing elements while being driven in the same direction as said shaft, each cage element being directly coupled to an output shaft, said output shafts and input shafts being coaxially aligned.

7. In a differential housing, having a ring gear mounted thereabout for rotary drive thereof, a pair of side gears mounted within said housing meshing with several spider gears therebetween, a pair of co-axial speed reducing elements having a single axially aligned shaft having a pair of cams mounted on each axial end thereof, a rotary reactor housing mounted about each cam concentric with said shaft, each reactor housing having a series of radial convolutions about the inner radial surface thereof, a series of radially displaceable elements mounted between each cam surface and the surrounding convoluted reactor surface, there being at least one displaceable element for each convolution, a cage element rotatably and displaceably supporting said displaceable elements in circumferentially spaced position about a cam surface, said cage element being mounted for rotation within the reactor housing, each cage element being directly coupled to an axle shaft co-axially aligned with the first mentioned shaft, and each reactor housing being concentrically aligned with said side gears and drivingly coupled thereto.

8. A differential gearing comprising a housing, means for rotatively driving the housing, differential gearing in said housing comprising a pair of side gears meshing with and separated by spider gears, two output means, and co-axial non-reversible means for reducing the speed of one output means relative to the other reacting on each of said side gears.

9. A differential gearing comprising a housing, means for rotatively driving the housing, a pair of side gears in said housing meshing with and separated by spider gears, coaxial non-reversible speed reducing means reacting on each of said side gears, each speed reducing means comprising an input and an output drive and being of non-reversible type wherein speed reduction is obtained when the drive shaft drives the output and locking up to 1 to 1 ratio when the output tends to drive the input, and a single common rotary shaft connecting the inputs of the speed reducing means.

10. In combination a pair of speed reducing means coaxial of one another having a single common input drive shaft for both, said speed reducing means each having an independent output drive shaft, each coaxially aligned with said input drive shaft, each of said speed reducing means having a rotary mounted reactor housing whereby rotary input power to each speed reducing means will drive the rotary power output shafts at reduced speeds and in the same direction or said reactor housings relatively in reverse, said speed reducing means being of non-reversible type wherein speed reduction is obtained when the drive shaft drives the output and locking up to 1 to 1 ratio when the output drives the input.

(References on following page)

References Cited in the file of this patent

UNITED STATES PATENTS

| | | |
|---|---|---|
| 1,209,007 | Mennie | Dec. 19, 1916 |
| 1,341,162 | Armistead | May 25, 1920 |
| 1,401,204 | Storey | Dec. 27, 1921 |
| 1,449,352 | Seeck | Mar. 20, 1923 |
| 1,738,662 | Morison | Dec. 10, 1929 |
| 1,824,196 | Cullen | Sept. 22, 1931 |
| 1,870,875 | Scheuer | Aug. 9, 1932 |
| 1,938,457 | McCaffery | Dec. 5, 1933 |
| 1,964,956 | Lincoln | July 3, 1934 |
| 1,968,801 | Moffett | July 31, 1934 |
| 2,276,821 | Boor | Mar. 17, 1942 |

FOREIGN PATENTS

| | | |
|---|---|---|
| 3,104 | Great Britain | Feb. 6, 1913 |